United States Patent [19]

Stimeling

[11] Patent Number: 4,744,539
[45] Date of Patent: May 17, 1988

[54] VEHICLE MOUNTING ARRANGEMENT

[75] Inventor: David F. Stimeling, Orefield, Pa.

[73] Assignee: Mack Trucks, Inc., Allentown, Pa.

[21] Appl. No.: 5,766

[22] Filed: Jan. 21, 1987

[51] Int. Cl.$^4$ .............................................. F16M 3/00
[52] U.S. Cl. ..................................... 248/638; 248/632
[58] Field of Search .............. 248/638, 637, 650, 660, 248/674, 566, 634, 632, 611

[56] References Cited

U.S. PATENT DOCUMENTS

| | | | |
|---|---|---|---|
| 1,566,026 | 12/1925 | Leipert et al. | 248/637 |
| 1,798,580 | 3/1931 | Bell | 248/638 |
| 1,913,936 | 6/1933 | Lee | 248/638 |
| 2,661,943 | 12/1953 | Wilbur | 248/632 X |
| 3,430,901 | 3/1969 | Cauvin | 248/638 |
| 4,159,091 | 6/1979 | Le Salver et al. | 248/634 X |
| 4,183,496 | 1/1980 | Brock et al. | 248/638 |
| 4,238,104 | 12/1980 | Hamilton | 248/638 X |
| 4,240,141 | 12/1980 | Vasiliev et al. | 248/638 X |
| 4,424,961 | 1/1984 | Takei | 248/632 X |
| 4,595,167 | 1/1986 | Tangorra et al. | 248/638 |
| 4,648,579 | 3/1987 | Wilson | 248/638 |

FOREIGN PATENT DOCUMENTS 2083591  3/1982  United Kingdom ............... 248/638

Primary Examiner—Ramon O. Ramirez
Attorney, Agent, or Firm—Bernard, Rothwell & Brown

[57] ABSTRACT

An engine mounting arrangement includes a laminated elastomeric member interposed between an engine mounting bracket and a cross member of the vehicle frame for supporting the front end of the engine. The laminated elastomeric member is composed of a plurality of horizontally extending sheets of elastomeric material and a plurality of metal sheets, the sheets of elastomeric material and the metal sheets being arranged in alternating order to form the laminated structure. The elastomeric material employed is relatively soft so as to effectively reduce the transmission of low frequency vibrations associated with the operation of heavy duty engines at low speeds. To limit lateral movement of the engine during vehicle turns or extreme articulations, the mounting arrangement includes a support member for the laminated elastomeric member, the support member being mounted on the cross member of the vehicle frame. This support member includes upwardly extending legs at the ends thereof and stops including elastomeric material are secured to the legs in alignment with the ends of the laminated elastomeric member.

8 Claims, 2 Drawing Sheets

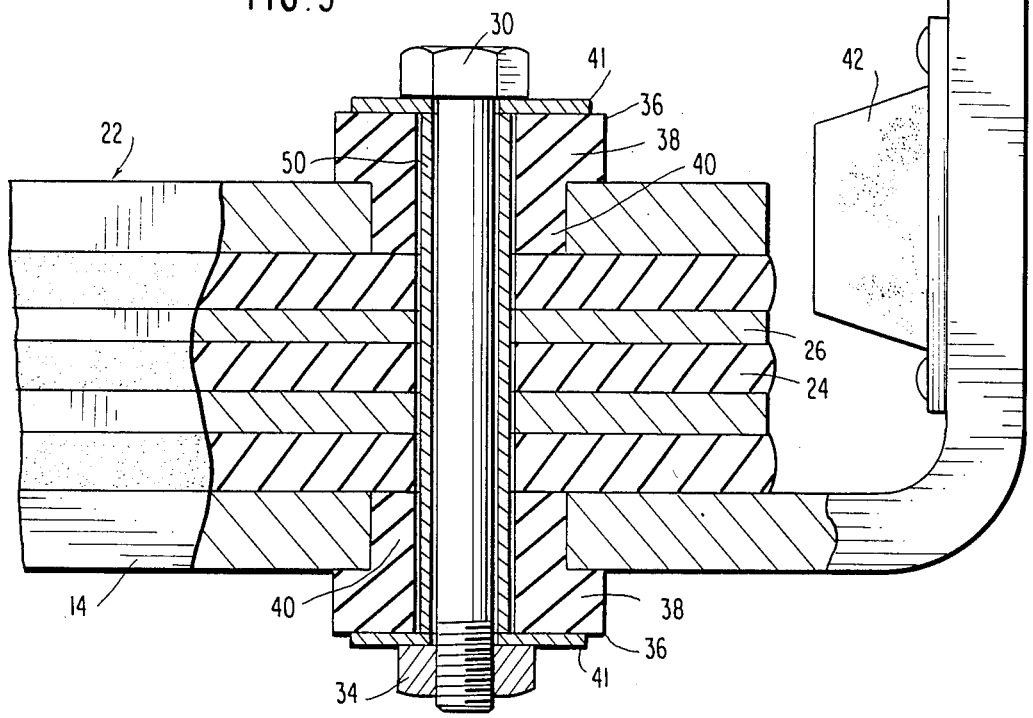
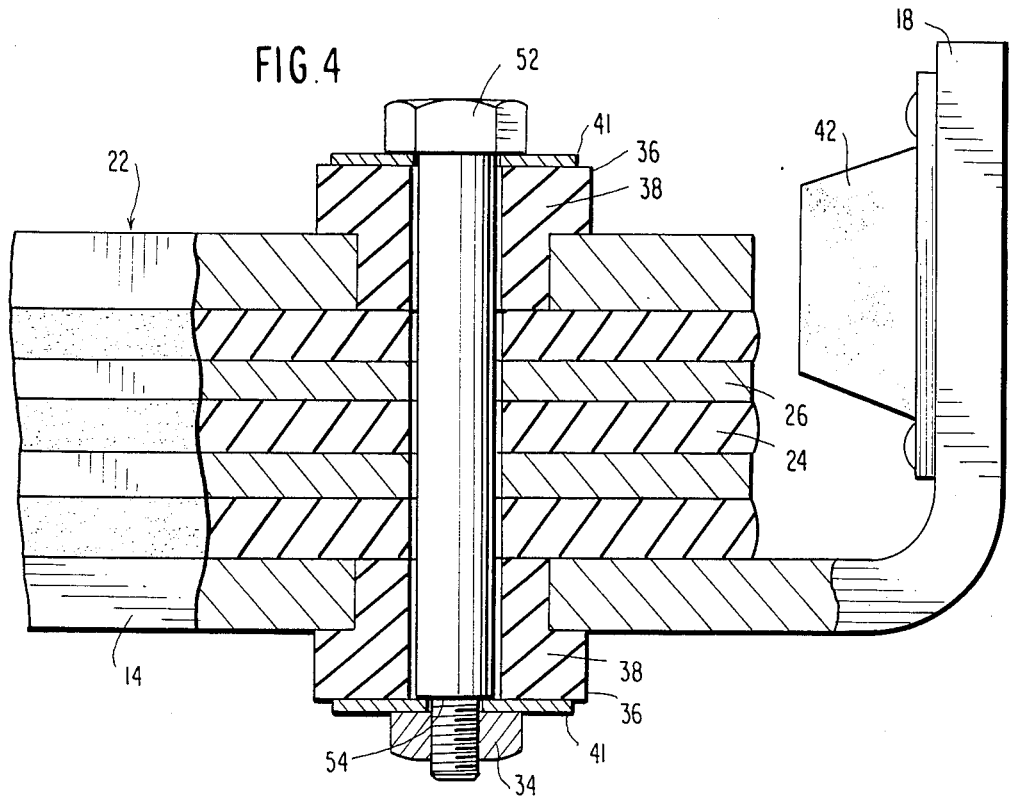

VEHICLE MOUNTING ARRANGEMENT

BACKGROUND OF THE INVENTION

1. Field of the Invention

This invention relates to mounting arrangements for a vehicle engine, and more particularly to arrangements for mounting the front end of such engines.

2. Description of the Prior Art

Proper mounting of the front end of a vehicle engine, and particularly engines for heavy vehicles such as trucks, imposes multiple requirements which are not fully compatible. Thus, one requirement is to isolate as much as possible the engine vibrations from the frame and the remainder of the truck, particularly the truck cab and the instrumentation therein and the occupants thereof. A second requirement is to limit the lateral movement of the engine relative to the frame, particularly during turning movement of the vehicle and extreme chassis articulations.

The former requirement is more satisfactorily met by using a relatively soft elastomeric material which minimizes the transmission of vibrations, and particularly vibrations of low frequency which are associated with heavy engines operating at relatively low speeds. On the other hand, minimizing the lateral movement of the engine in the case of vehicle turns or extreme articulation is better achieved by using a relatively stiff elastomeric material.

In the prior art two types of engine mounting arrangements have been employed. In one type of mounting arrangement, referred to as a trunnion-type mount, an annular band of elastomeric material is interposed between a trunnion portion of the engine mounting structure and the supporting portion of the frame. In the second type, referred to as a biscuit-type mount, cylinders of elastomeric material are interposed between the bottom of the engine and the supporting cross member of the vehicle frame. In both cases it has been necessary to make a compromise between the optimum characteristics of the elastomeric material for purpose of minimizing transmission of vibrations, and particularly low frequency vibrations, and the optimum characteristics of the elastomeric material for the purpose of minimizing lateral movement of the engine. As a result of this compromise, neither objective is ideally achieved.

The mounting arrangement of the subject invention is designed to achieve both objectives in an optimum fashion without the necessity of the compromise associated with prior art mounting arrangements. The mounting arrangement of this invention makes it possible to utilize elastomeric material which is relatively soft and thereby minimizes the transmission of low frequency vibrations to the vehicle body and components thereof and, at the same time, to limit satisfactorily the amount of lateral motion of the engine under conditions of vehicle turning or extreme articulation. By the mounting arrangement of this invention, collateral benefits are achieved, such as the elimination of the need for additional noise control material on the vehicle body, minimizing of the amount of area of elastomeric material exposed to destructive environmental elements such as oil, gasoline and ozone, elimination of extensive bracing for body components which must remain in a set position, such as rear vision mirrors, and minimizing adverse effects on sensitive instrumentation in the vehicle cab.

It is an object of this invention to minimize transmission vibrations from the engine to the vehicle body and especially low frequency vibrations occurring when an engine, particularly a heavy duty engine, is operating at low speeds.

It is another object of this invention to minimize such vibrations and at the same time effectively limit lateral movement of the engine relative to the frame, particularly during vehicle turns or extreme chassis articulations.

It is a further object of this invention to provide an engine mounting arrangement which permits utilization of softer elastomeric material, thereby effectively reducing transmission of low frequency noise, while still effectively limiting lateral positional deviation of the engine.

SUMMARY OF THE INVENTION

In carrying out the objects of this invention, in one embodiment thereof, a laminated elastomeric member is interposed between an engine mounting bracket and a cross member of the vehicle frame for supporting the front end of the engine. The laminated elastomeric member is composed of a plurality of horizontally extending sheets of elastomeric material and a plurality of metal sheets, the sheets of elastomeric material and the metal sheets being arranged in alternating order to form the laminated structure. The individual sheets of elastomeric material are thinner than the elastomeric material employed in prior art mounting arrangements and thereby the exposure of the elastomeric material to destructive elements such as gas, oil and ozone is minimized. Further, the elastomeric material employed is relatively soft so as to effectively reduce the transmission of low frequency vibrations associated with the operation of heavy duty engines at low speeds. To limit the positional deviation, that is lateral movement of the engine, during vehicle turns or extreme articulations, the mounting arrangement of this invention includes a support member for the laminated elastomeric member, the support member being mounted on the cross member of the vehicle frame. This support member includes upwardly extending legs at the ends thereof and stops are secured to the legs in alignment with the ends of the laminated elastomeric member. The stops comprise cushioning material, preferably also an elastomeric material. Lateral movement of the engine relative to the vehicle frame is limited by engagement of the laminated elastomeric member with one or the other of these stops.

BRIEF DESCRIPTION OF THE DRAWING

FIG. 3 is a view partly in section, of a portion of the engine mounting arrangement of this invention, showing a modified fastening structure.

FIG. 4 is a view similar to FIG. 3 showing another modified fastening structure.

DESCRIPTION OF THE PREFERRED EMBODIMENT

Figure 1:
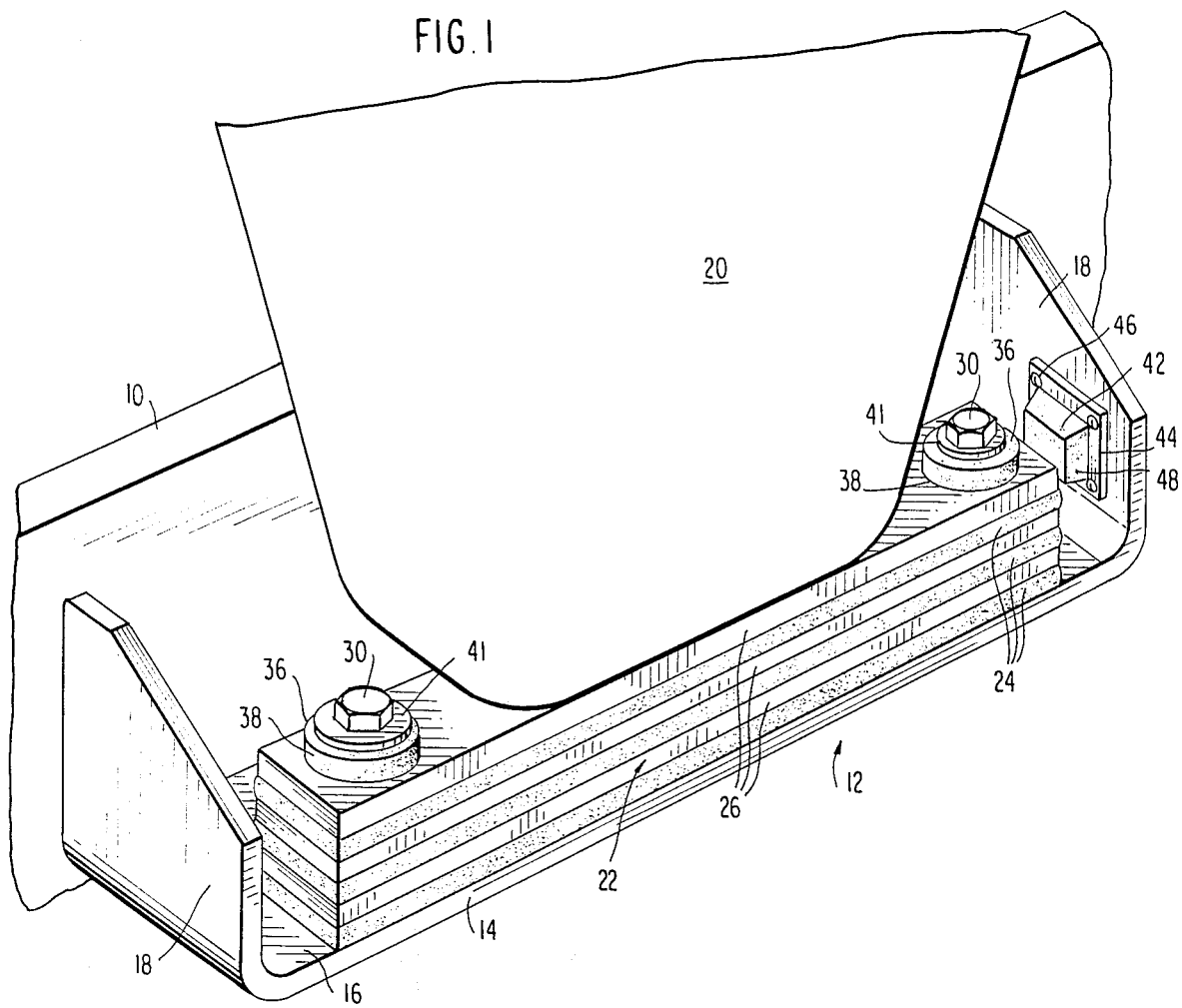
FIG. 1 is a view of a portion of a cross member of a vehicle frame showing the engine mounting arrangement of this invention supported thereon.

Referring to FIG. 1 there is shown a portion of a cross member 10 of a vehicle frame. In a conventional engine frame this cross member extends between two spaced rails which extend longitudinally of the vehicle frame. The rails and the remainder of the cross member are not shown in FIG. 1 since they are conventional elements well known in the field and are not part of the present invention.

The engine mounting arrangement of this invention is indicated generally by the numeral 12. The engine mounting arrangement includes a supporting shelf or bracket 14. This bracket is of generally U-shape and includes a horizontal portion 16 and spaced upwardly extending legs 18 at the ends thereof. The shelf 14 is mounted on the cross member 10 in any suitable manner, as by welding. The engine (not shown) is supported on the above structure by an engine attachment bracket 20 which may be of any suitable shape and is secured to the engine in any suitable manner.

In normal operation an engine, and particularly a heavy duty truck engine for which the subject invention is most advantageous, develops vibrations which tend to be transmitted through the engine support to the vehicle body and the occupants thereof. Such vibrations require extra bracing of some components of the vehicle body, for example rear view mirrors; they can be damaging to sensitive instrumentation mounted in the vehicle cab; and they have an adverse effect on the comfort of the occupants of the cab.

Figure 2:
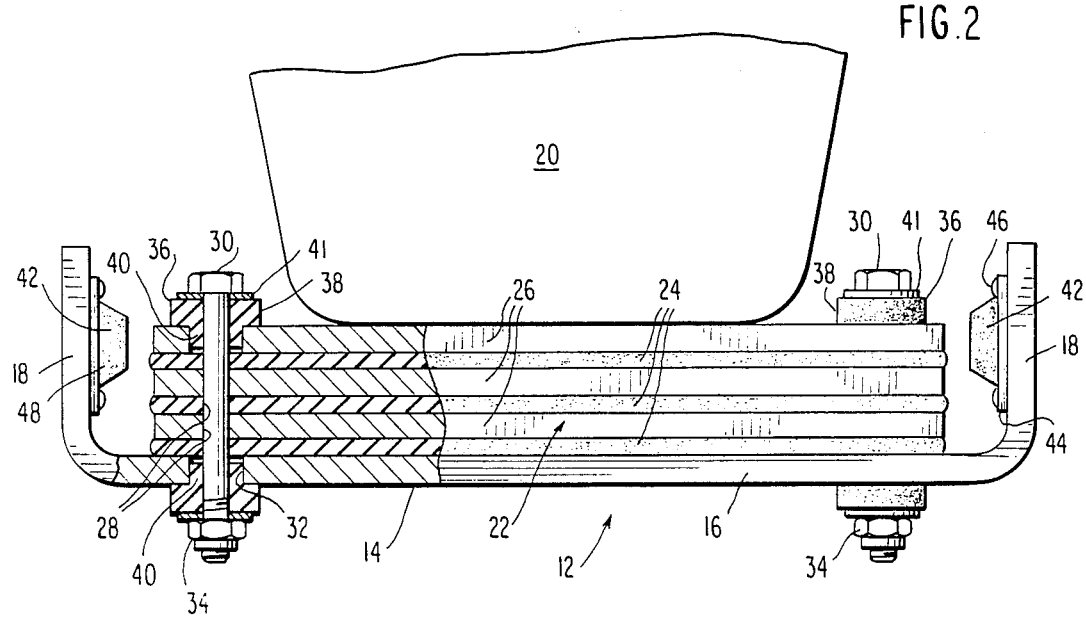
FIG. 2 is a view, partly in section, of the engine mounting arrangement of this invention.

Accordingly, it is desirable to provide a mounting arrangement for the engine which minimizes transmission of such vibrations from the engine to the vehicle body. In order to achieve this isolation of engine vibrations in accordance with this invention, and particularly low frequency vibrations associated with the operation of heavy duty engines at low speeds, a laminated elastomeric member 22, shown in further detail in FIG. 2, is provided for supporting the front end of the engine on the cross member 10. More particularly, the laminated elastomeric member 22 includes a plurality of horizontally extending spaced sheets 24 of elastomeric material and a plurality of horizontally extending metal sheets 26. The sheets 24 and the sheets 26 are arranged, as illustrated in the drawings, in alternating fashion to provide a laminated structure of sandwiched elastomeric sheets and metal sheets.

In the specific embodiment illustrated the laminated elastomeric structure is made of three elastomeric sheets and three metal sheets, but it will be apparent that a greater or lesser number of sheets may be employed. In one specific embodiment of this invention the metal sheets are approximately ⅛" thick and the elastomeric sheets are approximately ¼" thick, but these thicknesses may be varied within reasonable limits depending on the degree of vibration isolation desired and the weight of the engine to be supported.

The arrangement illustrated provides for the utilization of thinner and softer elastomeric elements than are employed in conventional supporting structures, the vibration isolating effect being provided by the plurality of such elastomeric elements employed in the mounting structure of this invention. Because of the use of thinner sheets of elastomeric material the surface of the elastomeric material exposed to destructive elements in a vehicle environment, such as gas, oil and ozone, is minimized, providing a further advantage in addition to vibration isolation.

In order to fix the laminated elastomeric member of this invention on the shelf 14, aligned openings 28 are provided in the sheets 24 and 26. Bolts 30 extend through openings 32 in the shelf 14 and through the aligned openings 28 in the laminated elastomeric member. Nuts 34 engage the bolts 30 so that when nuts are tightened the laminated elastomeric member is firmly secured to the shelf 14. In order to isolate the vehicle frame further from engine vibrations, spacers 36 of elastomeric material are provided. Each spacer 36 includes a head portion 38 and an axially-extending body portion 40 of smaller diameter. The head portion 38 of the lower spacer engages the lower surface of the shelf 14 and the head portion of the upper spacer engages the top surface of the laminated elastomeric member 22. The axially-extending portion of the lower spacer is received in the opening 32 in the shelf member 14 and the axially-extending portion of the upper spacer is received in one of the aligned openings 28 in the laminated elastomeric member. A metal washer 41 is interposed between the head of each bolt 30 and the corresponding upper spacer 36 and a similar metal washer is interposed between each nut 34 and the corresponding lower spacer 36.

In order to provide position control of the laminated elastomeric member 22, specifically to limit lateral movement of the engine during vehicle turns or extreme chassis articulation, centering stops 42 are provided on the inside of each of the legs 18 in line with the ends of the laminated elastomeric member, so as to be engaged by the laminated elastomeric member after limited movement of the engine in either lateral direction. Each stop 42 includes a metal base 44, which is secured to the corresponding leg 18 in any suitable manner, as by welding or by screws 46, and a cushioning member 48 bonded to the base 44. The cushioning member 48 of each stop 42 is also formed of elastomeric material. However, since the stops are employed primarily to limit lateral movement of the engine, they are made of a somewhat stiffer elastomeric material than the sheets 24 discussed above.

In order to limit the amount of torque which the factory worker may effectively apply to the bolts 30 and nuts 34 during assembly to a predetermined maximum, and thereby to minimize crushing of the elastomeric material, the modified fastening constructions shown in FIGS. 3 and 4 may be employed.

Referring to FIG. 3, the structure there disclosed differs from that employed in the embodiment of FIGS. 1 and 2 by the inclusion of a tubular spacer 50. This spacer is of a predetermined length relative to the thickness of the laminated elastomeric member. It is engaged at one end by the head of the bolt 30 through the intermediate washer 41 and at the other end by the nut 34 through the intermediate washer 41. The spacer thus limits the amount of compression which may be applied to the layers of elastomeric material and thus minimizes crushing of the elastomeric material.

Another arrangement for accomplishing this same result is shown in FIG. 4. In lieu of the tubular spacer 50 employed in the embodiment of FIG. 3, the embodiment of FIG. 4 utilizes a bolt 52 which is formed to include a shoulder 54 at the threaded end which limits the extent to which the nut 34 can be moved axially and thereby minimizes crushing of the layers of elastomeric material. The length of the spacer 50 and the length of the bolt 52 between its head and the shoulder 54 are chosen so that any compression of the elastomeric material during the tightening of the nuts 34 is properly limited.

Because of the provision of the stops and the resultant limiting of the lateral movement of the engine thereby, and because the use of a laminated structure which employs a plurality of relatively thin elastomeric elements rather than an integral elastomeric element, it is possible to employ a relatively soft elastomeric material in the laminated elastomeric member of this invention. The use of a relatively soft elastomeric material minimizes the transmission of low frequency vibrations from the engine, vibrations below approximately 30 Hz being the most troublesome low frequency vibrations in the case of heavier duty engines operating at low speed. By the applicant's arrangement, however, the stops 42, and specifically the cushioning member 48 thereof, can be made of a stiffer elastomeric material.

By the applicant's combined structure each component thereof can be selected to perform its function in an optimum manner. That is, for example, the elastomeric material of the sheets 24, contrary to the compromise required in conventional structures, need not be made stiff in order to limit the lateral movement of the engine during vehicle turns and extreme articulation, since this function is effectively performed by the centering stops 42 which are made of stiffer elastomeric material. Thus, the characteristics of the elastomeric material forming the sheets 24 may be chosen so as to be optimum for the vibration isolating function to be performed thereby. In the particular application here described, where a heavy duty engine operating at low speeds is employed, the characteristics of the elastomeric material of the laminated elastomeric member are selected so that a relatively soft elastomeric material which has a minimal transmission to low frequency vibrations is employed. The use of a laminated elastomeric member including a plurality of alternating sheets of elastomeric material and sheets of metal further aids by permitting the utilization of thin sheets of elastomeric material having relatively soft characteristics. Were a solid, rather than laminated, elastomer of the required total thickness employed, a stiffer elastomer would be required. The combined result of the mounting structure of this invention is to minimize the transmission of vibrations from the engine to the vehicle frame and body, with the attendant benefits discussed above, and at the same time to limit the lateral movement of the engine, even on sharp vehicle turns and extreme articulation, to an acceptable amount.

It is claimed:

1. An engine mounting arrangement for mounting an engine on a vehicle frame, said frame including a cross member, said mounting arrangement comprising:
   (a) a support member secured to said cross member, said support member including a horizontal portion and an upwardly extending leg at each end of said horizontal portion;
   (b) a laminated elastomeric member mounted on said horizontal portion of said support member for supporting the front end of the engine;
   (c) said laminated elastomeric member comprising a plurality of first horizontally-extending sheets of elastomeric material and a plurality of second horizontally-extending metal sheets, said first and second plurality of sheets being disposed in alternating fashion to form said laminated member, adjacent metal sheets being prevented from contacting each other by the interposed sheets of elastomeric material;
   (d) means for attaching said laminated member to said support member; and
   (e) stop means mounted on each of said legs in alignment with the ends of said laminated member for limiting lateral movement.

2. The mounting arrangement of claim 1 wherein said elastomeric material of said laminated member is relatively soft to minimize transmission of low frequency vibrations associated with low speed operation of the engine.

3. The mounting arrangement of claim 2 wherein said stop means includes a cushioning member of elastomeric material having a greater stiffness than that of the elastomeric material of said laminated member.

4. The mounting arrangement of claim 1 wherein said attaching means comprises aligned openings in said laminated member and said support member; and means extending through said aligned openings for fixing said laminated member to said support member.

5. The mounting arrangement of claim 4 wherein said last-named means comprises a bolt extending through said openings and a nut engaging said bolt for fixing said laminating member to said support member.

6. The mounting arrangement of claim 5 and further including a spacer of elastomeric material adjacent the head of said bolt and a spacer of elastomeric material adjacent said nut, each spacer including a head portion engaged by said bolt head or said nut and a body portion of smaller diameter received in one of said aligned openings.

7. The mounting arrangement of claim 5 and further including a tubular spacer of predetermined length relative to the thickness of said laminated elastomeric member, said tubular spacer being mounted on said bolt between the head of said bolt and said nut to limit the effective torque which can be applied and thereby to minimize crushing of the elastomeric material.

8. The mounting arrangement of claim 5 wherein said bolt is formed to include a shoulder at its threaded end to limit the extent to which the nut can be moved axially and thereby to minimize crushing of the elastomeric material.

* * * * *